United States Patent

[11] 3,542,070

[72] Inventor Walter R. Sheeter
 La Habra, California
[21] Appl. No. 715,731
[22] Filed March 25, 1968
[45] Patented Nov. 24, 1970
[73] Assignee All Power Manufacturing Co.
 Montebello, California
 a corporation of California

[54] PLURAL PASSAGE ROTARY VALVE
 6 Claims, 12 Drawing Figs.
[52] U.S. Cl. .................................................. 137/625.19
[51] Int. Cl. .................................................. F16k 5/04
[50] Field of Search .......................................... 137/625.19,
 625.23, 625.32, 625.47, 454.2, 454.6; 251/309,
 312, 316, 287, 288

[56] References Cited
UNITED STATES PATENTS

| | | | |
|---|---|---|---|
| 3,285,278 | 11/1966 | Corlett | 137/454.2 |
| 3,384,121 | 5/1968 | Spencer | 137/454.2 |
| 3,423,067 | 1/1969 | Foster | 251/309 |
| 3,430,919 | 3/1969 | Frazier | 251/312 |

FOREIGN PATENTS

| | | | |
|---|---|---|---|
| 639,539 | 6/1950 | Great Britain | 251/288 |
| 963,090 | 7/1964 | Great Britain | 251/309 |

Primary Examiner—William R. Cline
Attorney—William P. Green

ABSTRACT: A spray gun capable of discharging selectively either an air-liquid mixture or a stream of pure air, with the selection being made by a rotary valve unit consisting of an outer apertured sleeve, a rotary valve element proper in the sleeve, an actuating knob, and a motion limiting washer, all connected by a snap ring for removal as a unit from a chamber in the sprayer body.

Patented Nov. 24, 1970
3,542,070
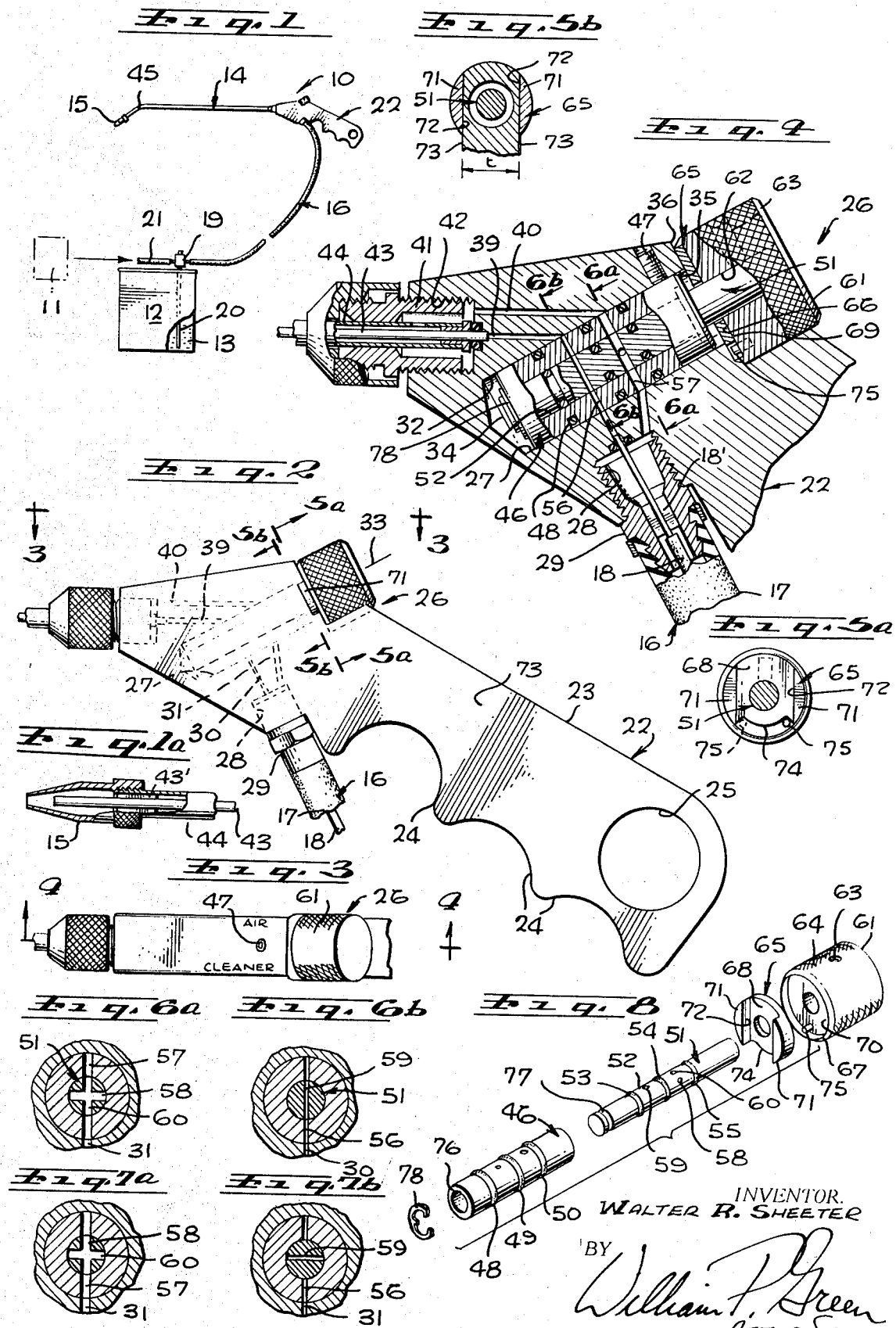
INVENTOR.
WALTER R. SHEETER
BY
William P. Green
ATTORNEY 3,542,070

PLURAL PASSAGE ROTARY VALVE

BACKGROUND OF THE INVENTION

This invention relates to a unique sprayer device which may be used for various purposes, but which is in certain respects especially intended and adapted for service as a cleaning device, for applying solvent or other cleaning liquid to, and then drying, a piece of equipment.

There have in the past been devised spray guns of various types for delivering fluids onto an object to be treated. In some of these prior arrangements, compressed air is utilized as a motive force for entraining a liquid, and forming with the liquid a combined air-liquid spray. However, none of these prior arrangements with which I am familiar has been completely satisfactory for use in performing small cleaning jobs around machine tools and other similar equipment, particularly where there are restricted inaccessible locations about the equipment into which most conventional types of cleaning equipment cannot reach. The previously devised spray equipment has usually been relatively bulky and inconvenient to move from place to place, and has in many instances been more difficult than would be desired to convert between its different operating conditions.

SUMMARY OF THE INVENTION

A sprayer constructed in accordance with the present invention includes a gun which can be very light and easily manipulated, and which can project into, and direct a fluid stream into, extremely inaccessible regions, to apply a cleaning solvent to those regions, and to blow debris to more accessible areas by an air or air-liquid stream. The gun can be very easily converted between its different operative conditions by manipulation of a unique control valve, preferably taking the form of a rotary valve element positioned for ready access and manual manipulation by the hand of a user.

The rotary valve element contains passages coacting with passages in an outer sleeve in valving relation. The valve element and the sleeve are desirably insertible as a unit into a valve chamber in the body, with the sleeve then being retained against rotation, so that the valve element will thereafter function by its rotation to control the delivery of fluids to the discharge nozzle. The sleeve is retained on the valve element by an appropriate retaining element, desirably a snap ring received within a groove in an axially inner end portion of the valve element. At its axially outer end, the valve element is connected to a rotary actuating element or knob, with a rotation limiting stop element being received at the axially inner side of the knob, and preferably taking the form of a washer engageable with the body of the gun in a manner retaining that element in fixed position.

BRIEF DESCRIPTION OF THE DRAWING

The above and other features and objects of the invention will be better understood from the following detailed description of the typical embodiment illustrated in the accompanying drawing, in which:

FIG. 1 is a small scale representation of a spray system constructed in accordance with the invention;

FIG. 1a is a section through the aspirator unit at the discharge end of the spray gun of FIG. 1;

FIG. 2 is a greatly enlarged side view of the handle portion of the sprayer of FIG. 1;

FIG. 3 is a fragmentary plan view taken on line 3–3 of FIG. 2;

FIG. 4 is a fragmentary vertical section taken primarily on line 4–4 of FIG. 3;

FIGS. 5a and 5b are transverse sections taken on lines 5a–5a and 5b–5b respectively of FIG. 2;

FIGS. 6a and 6b are sections taken on lines 6a–6a and 6b–6b respectively of FIG. 4, showing the valve in a first rotary setting;

FIGS. 7a and 7b are views corresponding respectively to FIGS. 6a and 6b, but showing the valve in a second rotary setting; and FIG. 8 is an exploded perspective view of the various parts forming the removable valve assembly.

DESCRIPTION OF THE PREFERRED EMBODIMENT

Referring first to FIG. 1, I have shown in that FIG. a sprayer system embodying the invention and which can serve very effectively as a portable cleaning system. The apparatus of FIG. 1 includes a spray gun 10 which receives air from a source of compressed air represented diagrammatically at 11. The gun also receives a liquid solvent from a small portable container 12 within which the solvent is represented at 13. The solvent may typically be an appropriate organic solvent, such as a conventional paint thinner, lacquer thinner, or the like, adapted to dissolve or loosen grease and other contaminants which may be found on or around the equipment to be cleaned. The air and solvent are discharged together from the gun through a discharge nozzle 14, having an aspirator or ejector unit 15 at its end at which the motion of the compressed air serves to draw the solvent 13 from tank 12 and through a hose 16 to the nozzle.

Hose 16 leading from tank 12 to the spray gun 10 is a conventional type of flexible two tube hose assembly, including an outer flexible tube or hose 17, and an inner concentric smaller flexible hose 18 dividing the interior of tube 17 into two isolated passages, one within the inner tube 18, and the other being the annular space radially between the two tubes. Fitting 19 mounted on the top of the container or tank 12 is designed to place the inner passage within tube 18 in communication through a pickup tube 20 with the solvent 13 in the tank, and to place the outer passage radially between tubes 17 and 18 in communication with line 21 leading from the air source 11. The two tubes 17 and 18 may be formed of any appropriate flexible and easily manipulatable material, such as a suitable resinous plastic material resistant to the particular solvent being used.

The spray gun 10 includes a rigid gun body 22, having a handle portion 23 dimensioned to be easily held in the hand of a user, with this handle portion having the side elevational configuration brought out in FIG. 2, to provide recesses 24 at its forward side adapted to receive the fingers of the user. An opening 25 may be formed in the lower end of the handle for use in hanging the gun on a hook or other support structure.

At the upper end of the handle, body 22 carries a rotary valve assembly 26, which is adapted to be preassembled before insertion into a valve chamber 27 formed in the body, and which functions to control the delivery of air and liquid from hose 16 to discharge nozzle 14. The hose 16 is connected upwardly into a threaded recess 28 in the underside of the upper portion of body 22, by means of a fitting 29 of a type known in the art, which fitting delivers the liquid from within tube 18 to a first passage 30 drilled in the material of body 22, and delivers the compressed air from the annular space about tube 18 to a second passage 31 drilled into the body (past a fluid passing spider 18' within the fitting).

Chamber 27 has a cylindrical side wall 32 centered about an inclined axis 33. This cylindrical side wall continues along substantially the entire length of the chamber, from its inner end 34 to the outer open end 35 of the chamber, at which body 22 forms a rearwardly facing planar wall or shoulder surface 36 disposed transversely of axis 33 and extending about chamber 27. The two previously mentioned liquid and air inlet passages 30 and 31 communicate with the interior of chamber 27 through circular openings extending through cylindrical wall 32 at the underside of the chamber. At diametrically opposite locations with respect to axis 33, two liquid and air discharge passages 39 and 40 communicate with the upper side of valve chamber 27, to lead liquid and air into a fitting 41 screwed into a forwardly facing bore 42 in body 22. Fitting 41 is of a known type serving to place liquid discharge passage 39 within the body in communication with an inner tube 43 of nozzle 14, while the fitting places outlet passage 40 of the body in communication with the annular space about tube 43 and between that tube and an outer concentric tube 44 of the nozzle. These two nozzle tubes 43 and 44 are rigid, and may be concentric along their entire length to the location of the outer aspirator fitting 15, which discharges the air past the end of inner tube 43 in a manner entraining liquid from within tube 43 into the air stream for discharge with the air in spray form. The nozzle 14 may typically have a bend near its end at a location 45, or may be of any other shape adapted to facilitate directing of the air or air-solvent mixture onto an item to be cleaned. The end of tube 43 may be centered in tube 44 by a fluid passing spider 43' (see FIG. 1a).

Valve assembly 26 includes a tubular internally and externally cylindrical sleeve 46, of an external diameter to fit closely within cylindrical wall 32 of the valve chamber 27, and retained in the FIG. 4 position within that chamber by a set screw 47 or the like. The outer cylindrical surface of sleeve 46 contains three axially spaced grooves within which there are received three elastomeric seal rings or O-rings, which annularly engage chamber wall 32 in fluid tight sealing relation at locations axially between and axially beyond the points of communication of passages 30, 31, 39, and 40 with the valve chamber.

Within sleeve 46, there is provided a rotary valve element 51, having an outer cylindrical surface 52 of a diameter to fit closely within the inner cylindrical passage in sleeve 46, and having grooves containing three elastomeric seal rings 53, 54, and 55 annularly engaging the sleeve in fluid tight sealing relation at locations radially opposite and corresponding to the positions of the three seal rings on the outer surface of the sleeve.

The tubular side wall of sleeve 46 contains two radially extending diametrically opposite and aligned openings or passages 56 which communicate with body passages 30 and 39 respectively, and contains two additional and similar radially extending diametrically opposite openings or passages 57 communicating with passages 31 and 40 respectively. To coact with and form a connection between the two sleeve openings 57, valve element 51 contains a diametrically extending passage 58 (FIG. 6a), and a second diametrical passage 60 at right angles thereto; and to coact with the sleeve openings 56, the valve element contains a diametrical passage 59 (FIG. 6b).

At its axially outer end, rotary valve element 51 is rigidly attached to and carries an actuating knob 61 (FIG. 4), which may contain a passage 62 adapted to fit closely about the outwardly projecting end of the valve element. Knob 61 may be secured to the valve element by a set screw 63 tightenable against the latter. The knob is desirably substantially cylindrical externally, but knurled at 64 to facilitate turning of the knob by the thumb and forefinger of the user's hand, while the rest of the fingers of that hand grasp handle portion 23 of body 22.

Disposed about valve element 51, at a location axially between sleeve 46 and knob 61, there is provided a stop washer 65, which may fit partially within a recess 66 formed on the forward side of the knob and defined by a peripheral flange or ridge 67 on the knob. The forward planar face 68 of washer 65 bears against rear planar surface 36 of gun body 22, while the rear planar annular 69 of the washer engages the forward circular planar face 70 of the knob, within its recessed area. At its opposite sides, the washer forms two forwardly directed or forwardly extending lugs or flanges 71, having opposed inwardly facing parallel planar surfaces 72 spaced in correspondence with the thickness $t$ (FIG. 5b) of gun body 22, and adapted to engage the opposite parallel planar side wall surfaces 73 of that body 22 in the relation illustrated in FIG. 5b, to effectively retain the washer against turning movement about axis 33 relative to the body. At its underside, the washer 65 has an arcuate cutaway or peripheral slot 74 which movably receives a stop pin 75 projecting forwardly from knob 61 (FIGS. 4, 5a, and 8), to limit the rotation of knob 61 and the attached valve element 51 to approximately 90° about axis 33.

At its forward, valve element 51 projects slightly forwardly beyond the transverse end surface 76 of sleeve 36, and contains an annular groove 77 (FIGS. 4 and 8) within which there is receivable and retainable a resilient snap ring 78, formed of spring steel or the like, and projecting radially far enough to engage the end of the sleeve in a manner retaining the valve element against axial withdrawal from the valve element.

To now describe the manner of use of the apparatus, assume that tank 12 has been filled with an appropriate liquid solvent, and that compressed air at a suitable pressure is being supplied by source 11 of FIG. 1. A user may then grasp the gun body at 23, and direct the discharge or aspirator end 15 of nozzle 14 toward a piece of equipment to be cleaned, with knob 61 turned to the valving position illustrated in FIGS. 6a and 6b, so that air is delivered through valve element 51 and to the nozzle by means of the passage 60 of FIG. 6a, while solvent is delivered to the nozzle through valve passage 59 of FIG. 6b. The air entrains and causes movement of the liquid at the aspirator 15, to form a combined air and finely divided mist form solvent spray which may be aimed by the nozzle for appropriate cleaning of a piece of equipment. After enough solvent has been delivered, the operator, while still grasping handle portion 23 of body 22 with his right hand, can reach upwardly with the thumb and forefinger of that same hand to engage opposite sides of knob 61 and turn that knob through 90° to the position represented in FIGS. 7a and 7b, in which position solvent is no longer delivered to the nozzle, but air alone is delivered, through the second passage 58 in the valve. The air stream may then be used to dry the object being cleaned.

If desired, the device can be adjusted to a third condition, to deliver a discharge stream which is primarily air but contains a very small amount of solvent. For this purpose, it is noted that the ends of the air passages 58 and 60 in the valve element (and communicating passages 57) are desirably of somewhat larger diameter than the ends of solvent passage 59 (and communicating passages 56), and are so located that by turning the knob very slightly from the position of FIGS. 6a and 6b, some but not all of the solvent flow may be closed off, while the air continues to flow with little or no reduction in volume, so that the desired thinner solvent-air mixture is attained. The air flow or the combined air-solvent flow may also be employed for blowing accumulated debris from inaccessible locations behind and around equipment, by merely directing the nozzle 14, or a substitute nozzle of straight or other shape, into the hidden area.

During initial assembly of the spray gun, the entire valve unit may be preassembled before insertion into chamber 27, and may then be inserted as a unit into the chamber, and be retained therein by the single set screw 47. Snap ring 78 holds the valve assembly, including sleeve 46, valve element 51, knob 61 and washer 65, together during installation, and retains the valve element and knob against withdrawal from the gun after installation. Also, in the event of operational difficulty with the valve unit, this entire assembly may be removed from the gun body and replaced very easily and quickly by another similar unit. I claim:

1. Apparatus comprising a body containing a valve chamber having two fluid inlet passages and two fluid outlet passages communicating therewith, an essentially tubular sleeve receivable in the body and extending about an axis and having two openings in its side wall communicating with said inlet passages respectively and two additional openings in its side wall communicable with said outlet passages respectively, and a rotary valve element extending axially within said sleeve and mounted to turn about said axis relative to the sleeve and body, said rotary valve element containing at least two passages acting in a first rotary setting of said element to pass two different fluids through said sleeve and said element between said inlet passages and said outlet passages, and acting in a second rotary setting to pass only one fluid to an outlet passage and close off the other fluid.

2. Apparatus as recited in claim 1, including spaced seal rings carried in grooves in the outer surface of said sleeve and engageable in sealing relation with the wall of said chamber at locations between and axially beyond said different inlet and outlet openings, and additional spaced seal rings carried in grooves in the outer surface of said rotary valve element and engaging the sleeve at locations between and axially beyond said passages in the valve element.

3. Apparatus comprising a body containing a valve chamber having fluid inlet and outlet passages communicating therewith, an essentially tubular sleeve receivable in the body and extending about an axis and having openings in its side wall communicating with said inlet and outlet passages, a rotary valve element extending axially within said sleeve and mounted to turn about said axis relative to the sleeve and body, said rotary valve element containing a passage acting in a first rotary setting of said element to pass fluid from an inlet passage through said sleeve and said element to an outlet passage, and acting in a second rotary setting to close off such fluid flow, a rotary actuating element connected to an axially outer end of said valve element and accessible for manual actuation at the outside of said body to turn the valve element between said settings, a stop washer located axially between said sleeve and said actuating element and retained by said body against rotary motion about said axis, said washer having a peripheral cutaway movably receiving a lug on said actuating element and engageable therewith to limit rotary motion of the actuating element and valve element.

4. Apparatus comprising a body containing a valve chamber having fluid inlet and outlet passages communicating therewith, an essentially tubular sleeve receivable in the body and extending about an axis and having openings in its side wall communicating with said inlet and outlet passages, a rotary valve element extending axially within said sleeve and mounted to turn about said axis relative to the sleeve and body, said rotary valve element containing a passage acting in a first rotary setting of said element to pass fluid from an inlet passage through said sleeve and said element to an outlet passage, and acting in a second rotary setting to close off such fluid flow, a rotary actuating element connected to an axially outer end of said valve element and accessible for manual actuation at the outside of said body to turn the valve element between said settings, a stop washer located axially between said sleeve and said actuating element and adjacent a portion of said body and having axially extending lugs at opposite sides of said body engageable with said sides of the body in a relation preventing rotary motion of the washer, and stop means on said actuating element and said washer limiting rotary motion of the actuating element.

5. Apparatus comprising a body containing a valve chamber having fluid inlet and outlet passages communicating therewith, an essentially tubular sleeve receivable in the body and extending about an axis and having openings in its side wall communicating with said inlet and outlet passages, a rotary valve element extending axially within said sleeve and mounted to turn about said axis relative to the sleeve and body, said rotary valve element containing a passage acting in a first rotary setting of said element to pass fluid from an inlet passage through said sleeve and said element to an outlet passage, and acting in a second rotary setting to close off such fluid flow, a rotary actuating element connected to an axially outer end of said valve element and accessible for manual actuation at the outside of said body to turn the valve element between said settings, a stop washer located axially between said sleeve and said actuating element and retained by said body against rotary motion about said axis, stop means on said washer limiting rotary motion of said actuating element, a snap ring connected to said valve element axially inwardly beyond said sleeve and retaining the valve element against withdrawal from the sleeve and thereby connecting the valve element, sleeve, actuating element and washer together for removal from the body as a unit.

6. Apparatus as recited in claim 5, in which there are two of said fluid inlet passages and two of said fluid outlet passages in the body, there being two of said openings in the sleeve communicable with said inlet passages respectively and two additional openings in the sleeve communicable with said outlet passages respectively, there being at least two of said passages in the rotary valve element operable in said first setting to pass two different fluids between said inlet passages and said outlet passages, and in said second setting to pass only one fluid to an outlet passage and close off the other fluid, there being spaced seal rings carried in grooves in the outer surface of said sleeve and engageable in sealing relation with the wall of said chamber at locations between and axially beyond said different inlet and outlet openings, and additional spaced seal rings carried in grooves in the outer surface of said rotary valve element and engaging the sleeve at locations between and axially beyond said passages in the valve element.